3,310,579
COLCHICEINAMIDE COMPOUNDS AND
PROCESS OF PREPARATION
Arturo Bladé, Paris, and Georges Muller, Nogent-sur-Marne, France, assignors to Roussel-UCLAF, Paris, France, a corporation of France
No Drawing. Filed Oct. 29, 1963, Ser. No. 319,665
Claims priority, application France, May 7, 1963, 933,955
4 Claims. (Cl. 260—465)

The present invention relates to new 1-cyano derivatives of colchiceinamides as well as a process of preparation of these compounds.

The invention more particularly relates to the 1-cyano-colchiceinamides of the general Formula I:

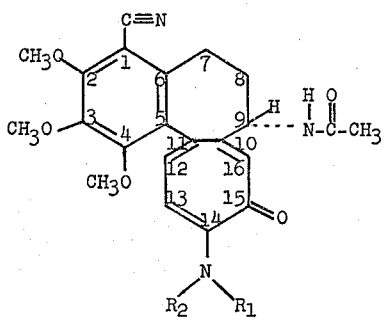

wherein $R_1$ represents hydrogen, an alkyl radical having from 1 to 8 carbon atoms, an aryl radical or an aralkyl radical, $R_2$ represents an alkyl radical having from 1 to 8 carbon atoms, an aryl radical or an aralkyl radical $R_1$ and $R_2$ can, in addition, represent together with the nitrogen a cyclic structure or also an oxygenated cyclic structure.

The fundamental skeleton of the colchicinic derivatives is numbered here and hereafter after the numeration of colchicine according to the general Formula I above. It could also be numbered following the RRI 3923 system of Ring Index, 2nd edition, 1960:

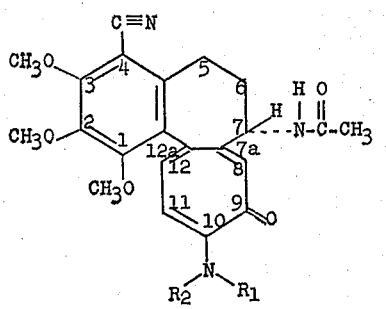

According to this system, the 1-cyano-colchiceinamides of the invention would be called 4-cyano-colchiceinamides.

The new compounds of the invention posses an interesting biological activity. More particularly, they exercise a remarkable antimitotic action and can be utilized, on the other hand, industrially in agriculture for modifications of mitosis and the creation of polyploids, either by sprinkling of aqueous solutions or suspensions of the compounds of the invention on cultivated soil, or by previous treatment of the seeds with the compounds of the invention, either pure or diluted in a solvent or on a support. In addition, the compounds can serve as intermediates for the preparation of other colchicinic derivatives.

It is an object of the present invention to produce novel 1-cyanated derivatives of colchiceinamides.

Another object of the invention is the obtention of a cyanated derivative of colchiceinamide of the formula selected from the group consisting of

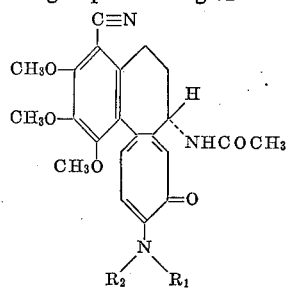

wherein $R_1$ is selected from the group consisting of hydrogen, alkyl having from 1 to 8 carbon atoms, aryl and aralkyl, $R_2$ is selected from the group consisting of alkyl having from 1 to 8 carbon atoms, aryl and aralkyl, and $R_1$ and $R_2$ together with the nitrogen atom form 5 to 6 membered heterocycles.

A further object of the invention is the development of a process for the production of a cyanated derivative of colchiceinamide of the formula selected from the group consisting of

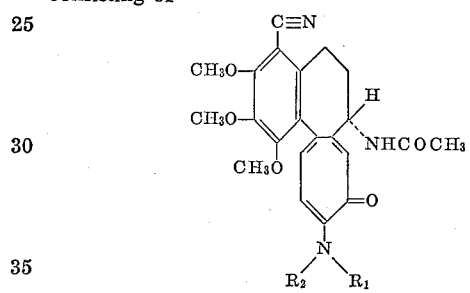

wherein $R_1$ is selected from the group consisting of hydrogen, alkyl having from 1 to 8 carbon atoms, aryl and aralkyl, $R_2$ is selected from the group consisting of alkyl having from 1 to 8 carbon atoms, aryl and aralkyl, and $R_1$ and $R_2$ together with the nitrogen atom form 5 to 6 membered heterocycles, which comprisess the steps of reacting 1-cyano-colchicine with an amine of the formula

where $R_1$ and $R_2$ have the above-assigned meanings in the presence of an inert solvent and recovering said cyanated derivative of colchiceinamide.

At still further object of the invention is the development of a process of reducing mitosis by the application of a safe but effective amount of the novel 1-cyanated derivative of colchiceinamides to cellular matter undergoing mitosis.

These and other objects of the invention will become more apparent as the description thereof proceeds.

The preferred compound, according to the invention, is 1-cyano-N-methyl-colchiceinamide of the formula:

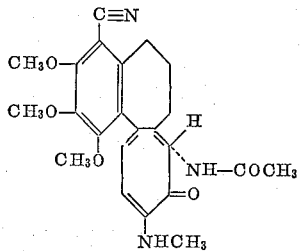

1-cyano-N-methyl-colchiceinamide occurs in the form of yellow prismatic crystals, soluble in hot alcohol, acetone, benzene and chloroform and insoluble in water, dilute aqueous acids and alkalis and ether. Its melting point determined on the Kofler block is 190°–194° C. and its specific rotation $[\alpha]_D^{20} = +5° \pm 2°$ (c.=0.5% in chloroform).

The useful dosology is controlled between 1 mg. and 25 mg. per day as a function of the method of administration.

The process of preparation of the compounds of the invention is characterized in that 1-cyano-colchicine is made to react with an amine of the formula

where $R_1$ and $R_2$ have the above-assigned meanings, in the presence of an inert solvent and the corresponding 1-cyano-colchiceinamide is isolated. Among the amines of the formula

are primary amines, such as monomethylamine, secondary amines such as dimethylamine, and cyclic secondary amines such as morpholine. Primary amines can be selected from monoalkylamines having 1 to 8 carbon atoms such as monomethylamine, monoethylamine; monophenylamines such as aniline; monophenylalkylamines having 1 to 8 carbon atoms such as monobenzylamine; etc. Secondary amines can be selected from dialkylamines having 1 to 8 carbon atoms, such as dimethylamine, diethylamine; cycloalkylamines having 4 or 5 carbon atoms, such as piperidine; and morpholine.

The execution of the process of the invention can be characterized in that the reaction can be conducted in an aqueous media in an organic, water-miscible solvent and at about room temperature.

The starting material, 1-cyano-colchicine, is prepared according to the operatory method described hereafter, as purely indicative. This method is further disclosed in the copending, commonly-assigned United States patent application Ser. No. 319,682, filed concurrently herewith.

The following examples illustrate the invention without, however, limiting it. It is to be understood that other equivalent expedients known to those skilled in the art may be employed.

EXAMPLE 1.—PREPARATION OF 1-CYANO-COLCHICINE

Step A.—Preparation of 1-formyl-colchicine 1.02 gm. of colchicine were dissolved in 10 cc. of methylene chloride and 0.8 cc. of stannic chloride were added thereto. The formation of an abundant yellow precipitate was observed and the temperature increased to 50° C. The reaction mixture was cooled to room temperature and 2.5 cc. of 1,1-dichloromethyl methyl ether were added thereto. The precipitate changed color and became red.

The reaction mixture was allowed to stand for two hours at room temperature. Then some water and methylene chloride were added. The mixture was triturated in order to decompose the complex and thereafter extracted with methylene chloride. The methylene chloride extract was washed with water and evaporated to dryness under vacuum.

1.10 gm. of raw 1-formyl-colchicine was obtained which was crystallized from ethyl acetate to give a product having an instantaneous melting point of 250° C. with a yield of 70–80%.

The product occurred in the form of colorless crystals, soluble in chloroform, slightly soluble in ethyl acetate and insoluble in water and ether.

The structure of 1-formyl colchicine was proved by the nuclear magnetic resonance spectra (NMR spectra).

By comparison with a number of colchicinic derivatives, the various functions such as the

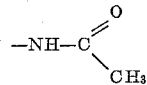

and $OCH_3$ functions and especially the proton functions in the $C_1$, $C_9$, $C_{12}$, $C_{13}$ and $C_{16}$ positions where located. By comparison to these known products, there was found in 1-formyl-colchicine the presence of two complexed protons, $C_{12}+C_{13}$, and the characteristic protons in the $C_9$ and $C_{16}$ positions. By contrast, the proton in the $C_1$ position which is located at 370 Hz. had disappeared. In addition, there was noted a new aldehydic proton at 592 Hz.

*Analysis.*—($C_{23}H_{25}O_7N$): Molecular weight=427.44. Calculated: C, 64.62%; H, 5.90%; N, 3.28%. Found: C, 64.4%; H, 6.0%; N, 3.2%.

Step B.—Preparation of the oxime of 1-formyl-colchicine

A mixture of 1.1 gm. of hydroxylamine hydrochloride, 14.5 cc. of ethanol and 5 gm. of 1-formyl-colchicine was introduced at room temperature into a solution of 650 mg. of sodium hydroxide in 6 cc. of water. The yellow solution obtained was allowed to stand for a period of four hours at room temperature. Next, this solution was poured into water and the aqueous material was extracted with methylene chloride. The extract was washed with water, dried over magnesium sulfate, filtered and distilled to dryness under vacuum.

The residue was redissolved in ethyl acetate and ether was added thereto. The mixture was allowed to stand at 0° C. for a period of one hour. The precipitate was vacuum filtered, washed with a mixture of ethyl acetate and ether and dried.

4.11 gm. of the oxime of 1-formyl-colchicine were obtained being a yield of 81%.

The product occurred in the form of yellow crystals, soluble in chloroform, acetone, ethanol and dilute aqueous acids and alkalis, and very slightly soluble in ether, benzene and water. The product had a melting point of 190°–200° C. and a specific rotation $[\alpha]_D^{20} = +246° \pm 2°$ (c.=0.5% in chloroform).

Analysis ($C_{23}H_{26}O_7N_2$): Molecular weight=442.45. Calculated: C, 62.43%; H, 5.92%; N, 6.33%. Found: C, 62.4%; H, 6.1%; N, 6.1%.

Step C.—Preparation of 1-cyano-colchicine 700 mg. of the oxime of 1-formyl-colchicine were introduced into 5.5 cc. of acetic acid anhydride. The reaction mixture was heated to reflux for a period of two hours, cooled and then some water was added thereto. The aqueous mixture was heated gently in order to hydrolyze the excess of the anhydride. Thereafter, it was neutralized with a sodium hydroxide solution and extracted with methylene chloride. The extract was washed with a saturated salt solution and dried over magnesium sulfate. Thereafter, the solution was subjected to chromatography through alumina and eluted with methylene chloride containing 1% of methanol. 440 mg. of 1-cyano-colchicine were thus obtained which was crystalized from ethyl acetate. 400 mg. of colorless crystals were obtained being a yield of 60%.

The product was soluble in chloroform, benzene, alcohol and acetone and insoluble in ether. It had a melting point of 258° C. and a specific rotation $[\alpha]_D^{20} = -50° \pm 10°$ (chloroform).

Analysis ($C_{23}H_{24}O_6N_2$): Molecular weight=424.44. Calculated: C, 65.08%; H, 5.70%; N, 6.60%. Found: C, 64.9%; H, 5.7%; N, 6.4%.

This compound was identical to that described in Ser. No. 319,682.

EXAMPLE 2.—PREPARATION OF 1-CYANO-N-METHYL-COLCHICEINAMIDE (I, $R_1$=H, $R_2$=$CH_3$)

In a balloon flask, 1.26 gm. of 1-cyano-colchicine were dissolved in 10 cc. of methanol. 15 cc. of a 36% aqueous solution of monomethylamine were added thereto. The reaction mixture was allowed to stand at room temperature for a period of two hours while passing a current of nitrogen therethrough. Thereafter, the mixture was concentrated under vacuum and filtered. The residue was vacuum filtered, washed with water and dried in an oven. 1.21 gm. of a product was obtained melting at 190–192° C. This product was purified by recrystallization from methanol. 1.05 gm. of 1-cyano-N-methyl-colchiceinamide (I, $R_1$=H, $R_2$=$CH_3$) were thus obtained in the form of a product crystallized in yellow prisms. The product was soluble in hot alcohol, acetone, benzene and chloroform and insoluble in water, dilute aqueous acids and alkalis and ether. The product melted at 190°–194° C. and had a specific rotation $[\alpha]_D^{20}$=+5°±2° (c.=0.5% in chloroform).

U.V. spectra:

$$\lambda_{max.}=209 \text{ m}\mu, E_{cm.1}^{1\%}=690$$
$$250 \text{ m}\mu, E_{cm.1}^{1\%}=967$$
$$354 \text{ m}\mu, E_{cm.1}^{1\%}=558$$
$$411 \text{ m}\mu, E_{cm.1}^{1\%}=290$$

Analysis ($C_{23}H_{25}O_5N_3$): Molecular weight=423.45. Calculated: C, 65.25%; H, 5.95%; N, 9.92%; $CH_3O$, 22.0%. Found: C, 65.2%; H, 6.0%; N, 9.7%; $CH_3O$, 21.4%.

This product is not described in the literature.

1-cyano-N-methyl-colchiceinamide is possessed of interesting pharmacological properties. It possesses particularly an important antimitotic action.

It can be used for the treatment of myeloidal leukemia, cutaneous neoplasia, digestive tumors and carcinomas in general.

1-cyano-N-methyl-colchiceinamide can be utilized orally, transcutaneously or in local applications. It can be prepared in the form of injectable solutions or suspensions, pepared in ampules, in multiple-dose flacons or also in sterile powders to be prepared at the moment of use in an appropriate solvent, in the form of tablets and pommades.

The useful dosology is controlled between 1 mg. and 25 mg. per day as a function of the method of administration.

The pharmaceutical forms such as injectable solutions or suspensions, sterile powders, tablets and pommades are prepared according to the usual processes.

EXAMPLE 3.—PHARMACOLOGICAL STUDY OF 1-CYANO-N-METHYL-COLCHICEINAMIDE

(A) Antimitotic activity

The antimitotic activity of 1-cyano-N-methyl-colchiceinamide (I, $R_1$=H, $R_2$=$CH_3$) was studied according to the method described by Jequier et al. (Arch. Int. Pharmacodyn. 1955, 103, 243).

This method is based on the following facts:

(1) In the rat, the index of cells in mitosis of the femoral bone marrow (cells in mitosis/total number of cells) is almost the same on smears taken from diverse regions and on several fields of the same smear. This index of cells in mitosis is normally between 10 and 20 parts per thousand.

(2) After subcutaneous injection of an anti-mitotic colchicinic compound, for example, colchicine, which blocks the diversion of the cells at an intermediate state of mitosis, this index of cells in mitosis is raised and attains its maximum toward the end of the 6th hour.

(3) The increase observed is a function of the dose administered. The correlation is clearly shown by a curve in the form of an S whose points of inflexion is situated toward the index of cells in mitosis of 100 per thousand.

As a measure of the stathmokinetic activity of the product the antimitotic dose 100 (DAM 100) defined as being that which furnishes 100 cells in mitosis for 1000 cells is chosen.

The standard technique utilized is the following:

(1) Subcutaneous injection of several doses of the substance to be studied is made to groups of two or three rats, the volume injected being held at 0.2 cc. per 100 gm. of body weight.

(2) The animals are sacrificed six hours after the injection. The femoral bone marrow is separated. Smears are prepared and colored by the May Grunwald-Giemsa stain and 1000 cells in each preparation is counted.

(3) The DAM 100 is determined according to the graph representing the index of cells in mitosis found as a function of the logarithm of the dose.

The DAM 100 of 1-cyano-N-methyl-colchiceinamide determined under the experimental conditions is 0.6 mg./kg.

As a comparison the DAM 100 of colchicine under the same experimental conditions is 0.7 mg./kg.

(B) Determination of toxicity

The test of toicity was effected on mice of the Rockland strain weighing between 18 and 22 gm. 1-cyano-N-methyl-colchiceinamide in aqueous suspension was administered intraperitoneally to groups of mice at increasing doses.

The animals were held under observation for a period of one week.

The lethal dose ($DL_{50}$) is about 50 mg./kg., whereas the ($DL_{50}$) of colchicine is equal to 2 mg./kg.

The comparison of the active dose (DAM 100) and the toxic dose ($DL_{50}$) of 1-cyano-N-methyl-colchiceinamide and of colchicine clearly shows for 1-cyano-N-methyl-colchiceinamide a much more favorable therapeutic margin than that of colchicine.

The preceding examples are illustrative of the invention. It is to be understood, however, that such changes and modifications as would occur to one skilled in the art may be employed without departing from the spirit of the invention or the scope of the appended claims.

We claim:

1. A cyanated derivative of colchiceinamide of the formula selected from the group consisting of

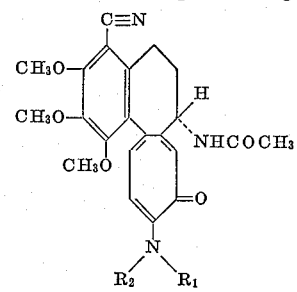

wherein $R_1$ is selected from the group consisting of hydrogen, alkyl having from 1 to 8 carbon atoms, phenyl and phenylalkyl having 6 to 8 carbon atoms, and $R_2$ is selected from the group consisting of alkyl having from 1 to 8 carbon atoms, phenyl and phenylalkyl having 6 to 8 carbon atoms.

2. 1-cyano-N-methyl-colchiceinamide of the formula

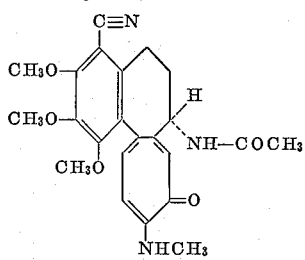

3. A process for the production of a cyanated derivative of colchiceinamide of the formula selected from the group consisting of

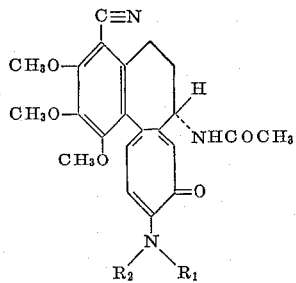

wherein $R_1$ is selected from the group consisting of hydrogen, alkyl having from 1 to 8 carbon atoms, phenyl and phenylalkyl having 6 to 8 carbon atoms, and $R_2$ is selected from the group consisting of alkyl having from 1 to 8 carbon atoms, phenyl and phenylalkyl having 6 to 8 carbon atoms, which comprises the steps of reacting 1-cyano-colchicine with an amine of the formula

where $R_1$ and $R_2$ have the above-assigned meanings in the presence of an inert aqueous solvent media at about room temperature and recovering said cyanated derivative of colchiceinamide.

4. The process of claim 3 wherein said amine is monomethylamine.

References Cited by the Examiner

UNITED STATES PATENTS

| | | | |
|---|---|---|---|
| 2,436,063 | 2/1948 | Adam et al. | 167—78 |
| 2,734,014 | 2/1956 | Bellet | 167—65 |
| 2,952,585 | 9/1960 | Heller | 167—78 |
| 3,000,927 | 9/1961 | Birum et al. | 260—465 |
| 3,018,304 | 1/1962 | Heininger et al. | 260—465 |

OTHER REFERENCES

Bateman Farming: The Journal of Agricultural Process, October 1949, pp. 313–316.

CHARLES B. PARKER, *Primary Examiner.*

IRVING MARCUS, JOSEPH P. BRUST, *Examiners.*

D. H. TORRENCE, D. R. MAHANAND,
*Assistant Examiners.*